(12) United States Patent
De Mers et al.

(10) Patent No.: US 8,456,445 B2
(45) Date of Patent: Jun. 4, 2013

(54) TOUCH SCREEN AND METHOD FOR ADJUSTING SCREEN OBJECTS

(75) Inventors: Robert E. De Mers, Nowthen, MN (US); Stephen Whitlow, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 623 days.

(21) Appl. No.: 12/771,469

(22) Filed: Apr. 30, 2010

(65) Prior Publication Data

US 2011/0267280 A1 Nov. 3, 2011

(51) Int. Cl.
*G06F 3/045* (2006.01)

(52) U.S. Cl.
USPC .......................................... 345/174; 345/178

(58) Field of Classification Search
USPC ................... 345/173–179; 178/18.01–18.07, 178/19.01–19.07, 20.01–20.04
See application file for complete search history.

(56) References Cited

U.S. PATENT DOCUMENTS

| | | | |
|---|---|---|---|
| 5,565,894 A | 10/1996 | Bates et al. | |
| 5,818,451 A | 10/1998 | Bertram et al. | |
| 5,877,751 A | 3/1999 | Kanemitsu et al. | |
| 6,067,081 A * | 5/2000 | Hahlganss et al. | 345/173 |
| 6,256,021 B1 | 7/2001 | Singh | |
| 6,456,952 B1 | 9/2002 | Nathan | |
| 6,492,979 B1 | 12/2002 | Kent et al. | |
| 6,985,137 B2 | 1/2006 | Kaikuranta | |
| 7,102,621 B2 | 9/2006 | Roberts | |
| 7,103,852 B2 | 9/2006 | Kairis, Jr. | |
| 7,154,483 B2 * | 12/2006 | Kobayashi | 345/173 |
| 7,567,861 B2 | 7/2009 | Inagaki | |
| 2007/0195065 A1 | 8/2007 | Nielsen | |
| 2008/0001929 A1 | 1/2008 | Wulff | |
| 2008/0172633 A1 | 7/2008 | Jeon et al. | |
| 2008/0186282 A1 | 8/2008 | Nix et al. | |
| 2009/0150814 A1 | 6/2009 | Eyer et al. | |

* cited by examiner

*Primary Examiner* — Vijay Shankar
(74) *Attorney, Agent, or Firm* — Ingrassia Fisher & Lorenz, P.C.

(57) ABSTRACT

A touch screen and method are provided for adjusting the positioning of touch sensing objects in response to the position of the application of one or more touches. The touch screen, includes, but is not limited to a display face including an object, the display face configured to display a symbol associated with the object, and circuitry defining the object and configured to sense the position of at least one touch on at least a portion of the object. A touch screen controller is configured to adjust the object in response to the position of the at least one touch.

17 Claims, 6 Drawing Sheets

US 8,456,445 B2

TOUCH SCREEN AND METHOD FOR ADJUSTING SCREEN OBJECTS

TECHNICAL FIELD

The exemplary embodiments described herein generally relate to touch screens and more particularly to a touch screen having adjustable screen objects.

BACKGROUND

World wide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. One such influence on flight performance has been the ability for the flight crew to input data while paying attention to other matters within and outside of the cockpit, especially during periods when movement makes it difficult to touch the panel in the desired manner or location. The ability to easily and quickly input data can significantly improve situational awareness of the flight crew.

Many electronic devices, such as aircraft flight deck operational equipment, cursor control devices (CCDs), hard knobs, switches, and hardware keyboards, are increasingly being replaced by touch panels. A touch panel offers intuitive input for a computer or other data processing devices, but may be affected by parallax distortion or movement of the touch panel and/or the pilot caused by, for example, turbulence, aircraft vibration, and/or G forces.

Accordingly, it is desirable to provide a touch screen whose input is adaptive to the movement caused by parallax or turbulence, G forces, and/or equipment vibrations. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A touch screen is provided for adjusting the positioning of touch sensing objects in response to the position of the application of one or more touches. The touch screen comprises a display face including an object, the display face configured to display a symbol associated with the object, and circuitry defining the object and configured to sense the position of at least one touch on at least a portion of the object. A touch screen controller is configured to adjust the object in response to the position of the at least one touch.

Another touch screen comprises a display face including an object having boundaries, the display face configured to display an icon within the object, and circuitry in communication with the display face and configured to define the object and sense the position of at least one touch by an operator on at least a portion of the object. A touch screen controller is configured to adjust the boundaries of the object in response to the position of the at least one touch.

A method is provided for adjusting an object of a touch screen, the object configured to sense a touch, the method comprising defining the location of the object on the face of a touch screen for selecting an associated symbol when touched, sensing one or more touches on at least a portion of the object, and adjusting the object in response to the position of the sensed one or more touches with respect to the object.

BRIEF DESCRIPTION OF THE DRAWINGS

The present invention will hereinafter be described in conjunction with the following drawing figures, wherein like numerals denote like elements.

DETAILED DESCRIPTION

Figure 1:
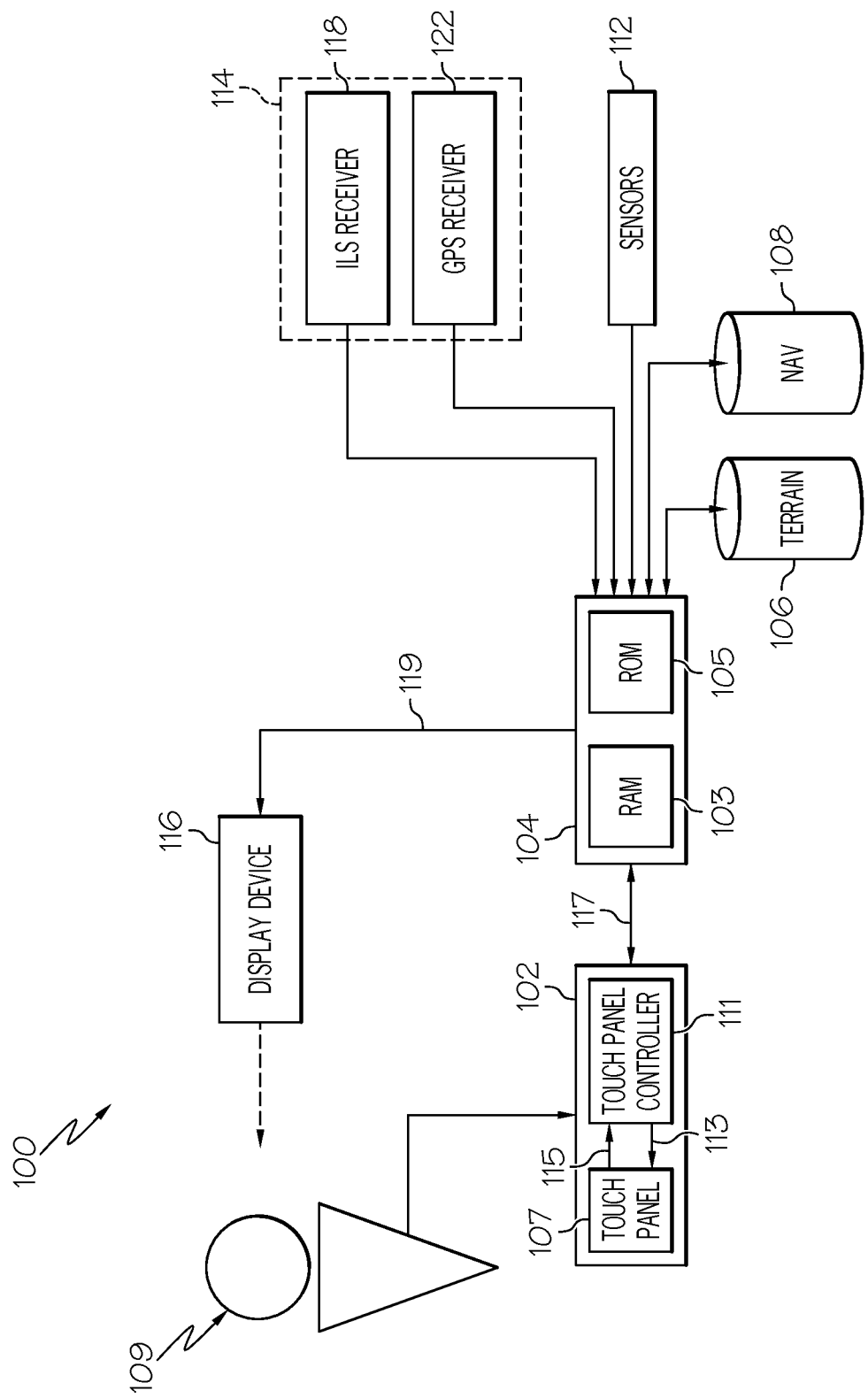
FIG. 1 is a block diagram of an aircraft system for presenting images on a display.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A touch screen is provided for adjusting the positioning of touch sensing objects in response to the position of the application of one or more touches. The touch screen comprises a display face including an object, the display face configured to display a symbol associated with the object, and circuitry defining the object and configured to sense the position of at least one touch on at least a portion of the object. A touch screen controller is configured to adjust the object, for example, the boundaries of the object, in response to the position of the at least one touch. A method of operating the touch screen includes identifying the object on the face of a touch screen for selecting an associated symbol when touched, sensing one or more touches on at least a portion of the object, and adjusting the object in response to the position of the sensed one or more touches with respect to the object.

The boundaries of the touch object generally match the boundaries of the symbol associated with the object. The touch screen controller will modify the boundaries of the object to shift in position so that it changes position in relation to the symbol. The controller may also modify the boundary so that the touch subject is larger than the symbol. These changes may be either symmetric or asymmetric, with the boundary being enlarged on only one edge or along only the horizontal axis or the vertical axis, in response to the one or more touches, thereby increasing the area defined by the object. The behavior of the touch screen may also be modified based upon the one or more touches. In turbulent conditions, the user may make multiple inadvertent inputs as their finger vibrates or jerks against the touch screen. In response to a predetermined frequency of touches on a single object, the system may determine that environmental conditions are interfering with normal operation of the system. In response to this behavior, the system may require the user to press down on an object for a longer period, or with higher force before it accepts the input as a valid entry.

Though the method and touch panel of the exemplary embodiments may be used in any type of electronic device, for example, vehicles and heavy machinery, and small handheld mobile devices such as smart phones, the use in an aircraft system is described as an example. Referring to FIG. 1, a flight deck display system 100 includes a user interface 102, a processor 104, one or more terrain databases 106 sometimes referred to as a Terrain Avoidance and Warning System (TAWS), one or more navigation databases 108, sensors 112, external data sources 114, and one or more display devices 116. The user interface 102 is in operable communication with the processor 104 and is configured to receive input from a user 109 (e.g., a pilot) and, in response to the user input, supplies command signals to the processor 104. The user interface 102 may be any one, or combination, of various known user interface devices including, but not limited to, one or more buttons, switches, or knobs (not shown). In the depicted embodiment, the user interface 102 includes a touch panel 107 and a touch panel controller 111. The touch panel controller 111 provides drive signals 113 to a touch panel 107, and a sense signal 115 is provided from the touch panel 107 to the touch panel controller 111, which periodically provides a controller signal 117 of the determination of a touch to the processor 104. The processor 104 interprets the controller signal 117, determines the application of the digit on the touch panel 107, and provides, for example, a controller signal 117 to the touch panel controller 111 and a signal 119 to the display device 116. Therefore, the user 109 uses the touch panel 107 to provide an input as more fully described hereinafter.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. The ILS 118 provides aircraft with horizontal (or localizer) and vertical (or glide slope) guidance just before and during landing and, at certain fixed points, indicates the distance to the reference point of landing on a particular runway. The GPS receiver 124 is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display devices 116 may additionally be implemented as a panel mounted display, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiment, however, one of the display devices 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

A touch screen is disclosed having at least one display region configured to display one or more symbols. Symbols as used herein are defined to include alphanumeric characters, icons, signs, words, terms, phrases, and menu items. A particular symbol is selected by sensing the application (touch) of a digit, such as a finger or a stylus, to a touch-sensitive object associated with that symbol. In some exemplary embodiments, the digit may be swiped, or moved, in a particular direction to enable a desired function. Each display region including a symbol has a touch-sensing object associated therewith for sensing the application and/or movement of the digit or digits.

There are many types of touch screen sensing technologies, including capacitive, resistive, infrared, surface acoustic wave, and embedded optical. All of these technologies sense touches on a screen. For example, U.S. Pat. No. 6,492,979 discloses the use of a combination of capacitive touch screen and force sensors, U.S. Pat. No. 7,196,694 discloses the use of force sensors at the peripherals of the touch screen to determine the position of a touch, and US patent publication 2007/0229464 discloses the use of a capacitive force sensor array, overlaying a display to form a touch screen.

Figure 2:
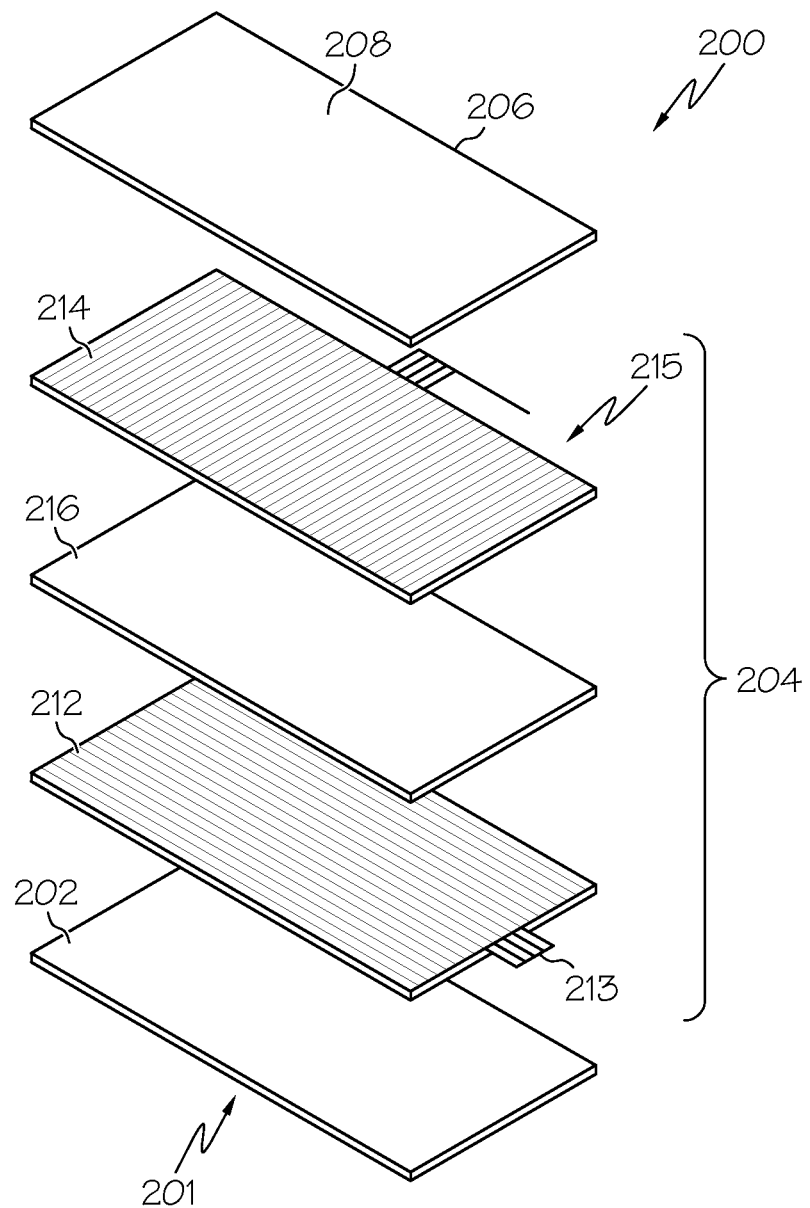
FIG. 2 is a partial perspective view of exemplary circuitry for sensing the touching of a digit on a touch screen.

Referring to FIG. 2, an exemplary touch screen includes a substrate 202, circuitry 204, and a layer 206. The layer 206 includes a face, or surface 208 upon which the symbols are displayed. The circuitry 204 may be any sensing technologies, including capacitive, projective capacitance, resistive, infrared, and surface acoustic wave, that senses a touch by a digit. A digit is defined herein as including a stylus, a finger, a finger enclosed in a material such as a glove, and any object that may be used to touch the surface 208. It is noted that some touch technologies (capacitive, Infrared) are capable of determining the location of the finger or stylus before contact with the screen actually occurs, wherein no actual touch is required for operation. The substrate 202, circuitry 204, and layer 206 would be formed of a transparent substrate, of glass or a polymer, for example, and a display generating device (not shown) such as a liquid crystal display would be positioned between the substrate 202 and the layer 206. Those skilled in the art will appreciate that other types of imaging devices 200 may be utilized as exemplary embodiments, including, for example, transmissive, reflective or transflective liquid crystal displays, cathode ray tubes, micromirror arrays, and printed panels.

The circuitry 204 includes two or more layers of patterned conductive traces 212, 214 deposited over the substrate. A flexible material 216 is deposited between the first and second patterned conductive traces at the intersection of each first and second conductive traces. The flexible material 216 is a continuous layer and, in the touch screen embodiment, preferably has a transparent elastomeric matrix, such as polyester, phenoxy resin, or silicone rubber.

The conductive traces 212, 214 are coupled to the touch panel controller through tabs 213, 215, respectively. By scanning the rows and columns of the conductive traces 212, 214 and mapping the resistance of the flexible material 216 at each intersection, a corresponding pressure map of the touch screen may be obtained. This map provides both the position and the movement of the corresponding touch.

By being able to sense this change in resistance as the digit touches the surface 208 due to pressure being applied to the pressure sensor 201, the selection of the appropriate symbol may be accomplished. The change in resistance between the traces 212, 214 is sensed and provided to the touch panel controller 111 and then to the processor 104.

While a touch screen is described wherein the application of the touch is determined by a change in resistance, there are many other technologies available that could be used, including Infrared and capacitive. And while alphanumeric characters are illustrated in the above exemplary embodiment, a symbol could comprise one or more items, including, for example, icons, signs, words, terms, and phrases, either alone or in combination. Furthermore, while a touch screen is described herein, it is understood that an exemplary embodiment could be a touch panel having a non-transparent top layer with symbols, for example, printed thereon.

Figure 3:
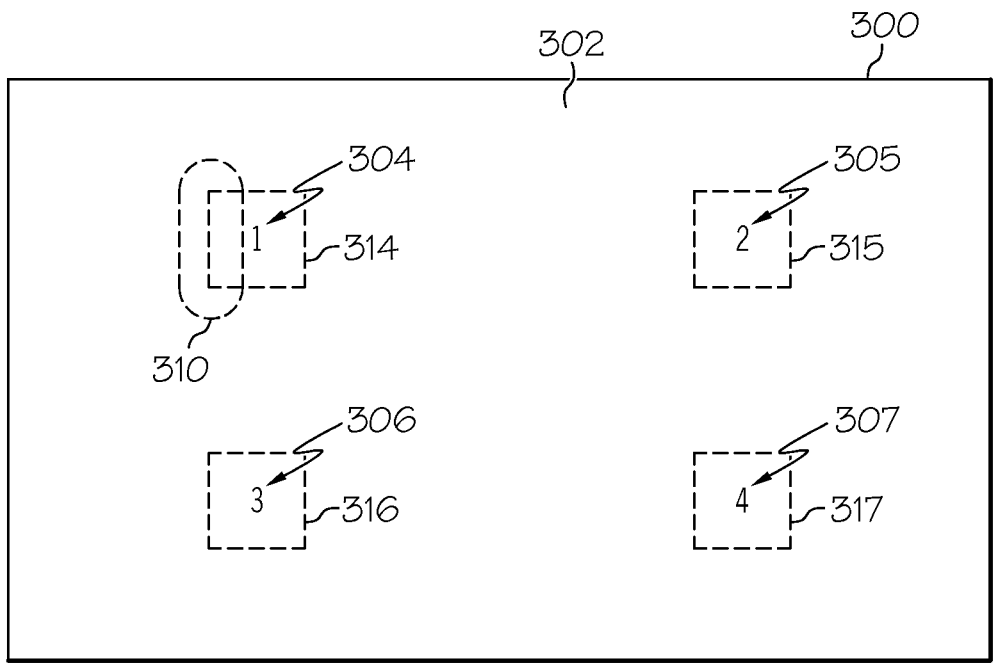
FIG. 3 is a representative diagram of a known touch screen.

Referring to FIG. 3, a touch screen 300 includes a face 302 and is displaying four symbols 304, 305, 306, 307 (shown for example, as the numbers 1, 2, 3, 4, respectively). Screen objects 314, 315, 316, 317 (shown as dotted lines) are positioned with respect to the symbols 304, 305, 306, 307, respectively. The screen objects 314, 315, 316, 317 are defined by selected pixels within the circuitry 512, 514 (FIG. 2) as determined by software in the processor 104. A touching of one of the screen objects 314, 315, 316, 317 will be sensed by the circuitry 512, 514. This information (the touch) is communicated to the processor 104 and the function associated with the respective symbol 304, 305, 306, 307 will be selected.

However, the operator of the touch screen 300 may not touch the center of the object 314, 315, 316, 317. For example, the operator may touch only the left side of the object 314 as illustrated by the dotted area 310. This may be caused, for example, by parallax error or movement of the screen or operator. Parallax is an apparent displacement or difference in the apparent position of a symbol viewed along two different lines of sight, and is measured by the angle or semi-angle of inclination between those two lines. A simple everyday example of parallax can be seen in the dashboard of motor vehicles that use a "needle" type speedometer gauge (when the needle is mounted in front of its dial scale in a way that leaves a noticeable spacing between them). When viewed from directly in front, the speed may show 60 (i.e. the needle appears above the '60' mark on the dial behind); but when viewed from the passenger seat (i.e. from an oblique angle) the needle can appear against a slightly lower or higher mark (depending on whether it is viewed from the left or from the right, or from a high seat position versus a low seat position), because of the combined effect of the spacing and the angle of view. The partial touching of the object 314, 315, 316, 317 may also be caused by movement of the touch screen and/or the operator, such as by turbulence or vibration.

Figure 4:
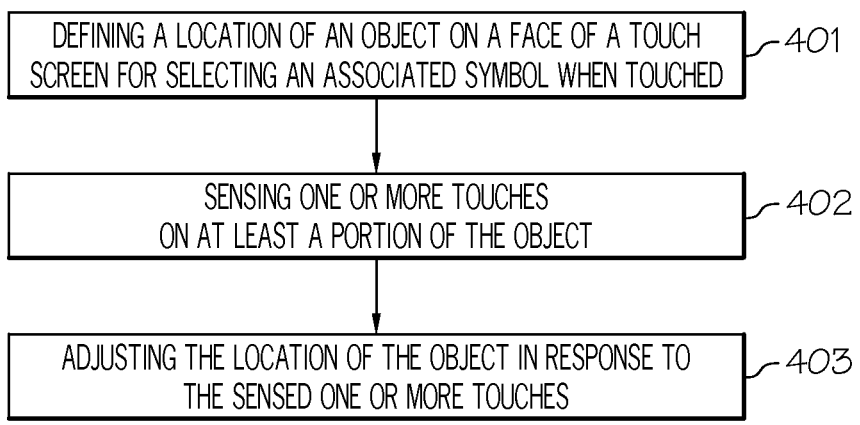
FIG. 4 is a flow chart in accordance with the exemplary embodiments.
Figure 6:
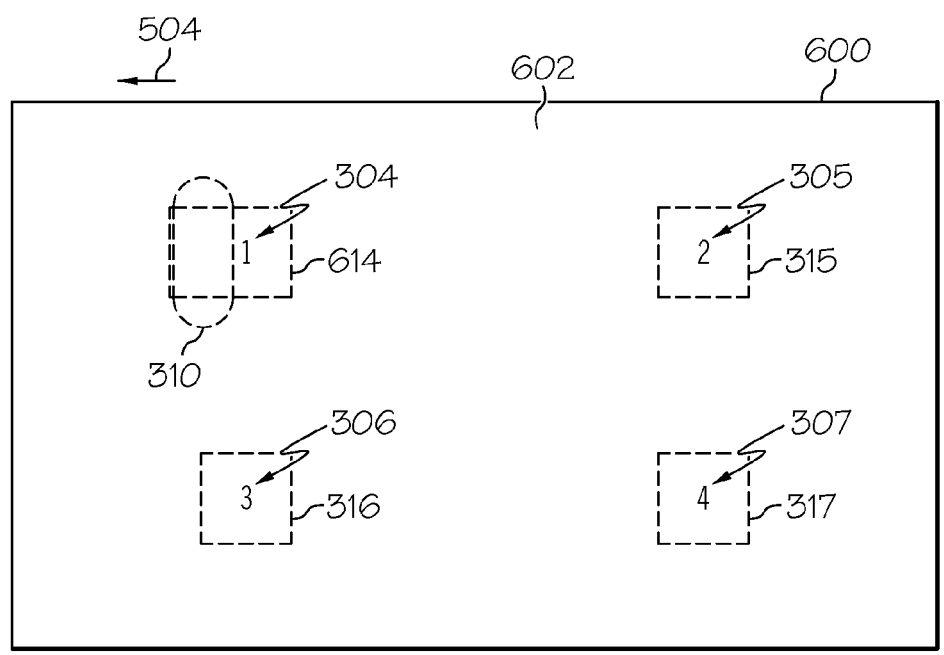
FIG. 6 is another representative diagram of a touch screen in accordance with the exemplary embodiments.
Figure 7:
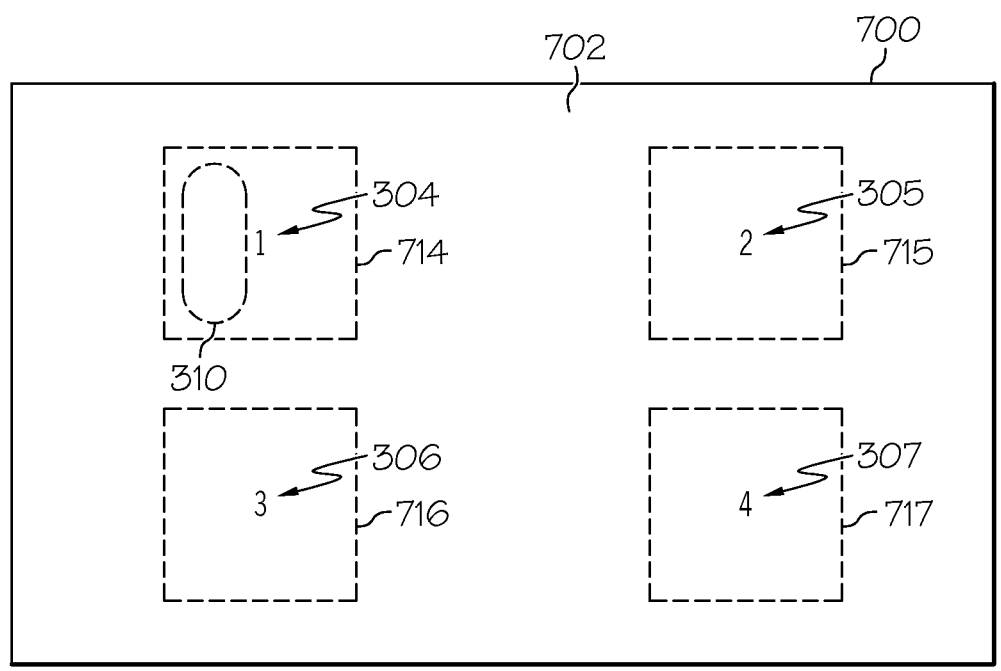
FIG. 7 is yet another representative diagram of a touch screen in accordance with the exemplary embodiments.
Figure 8:
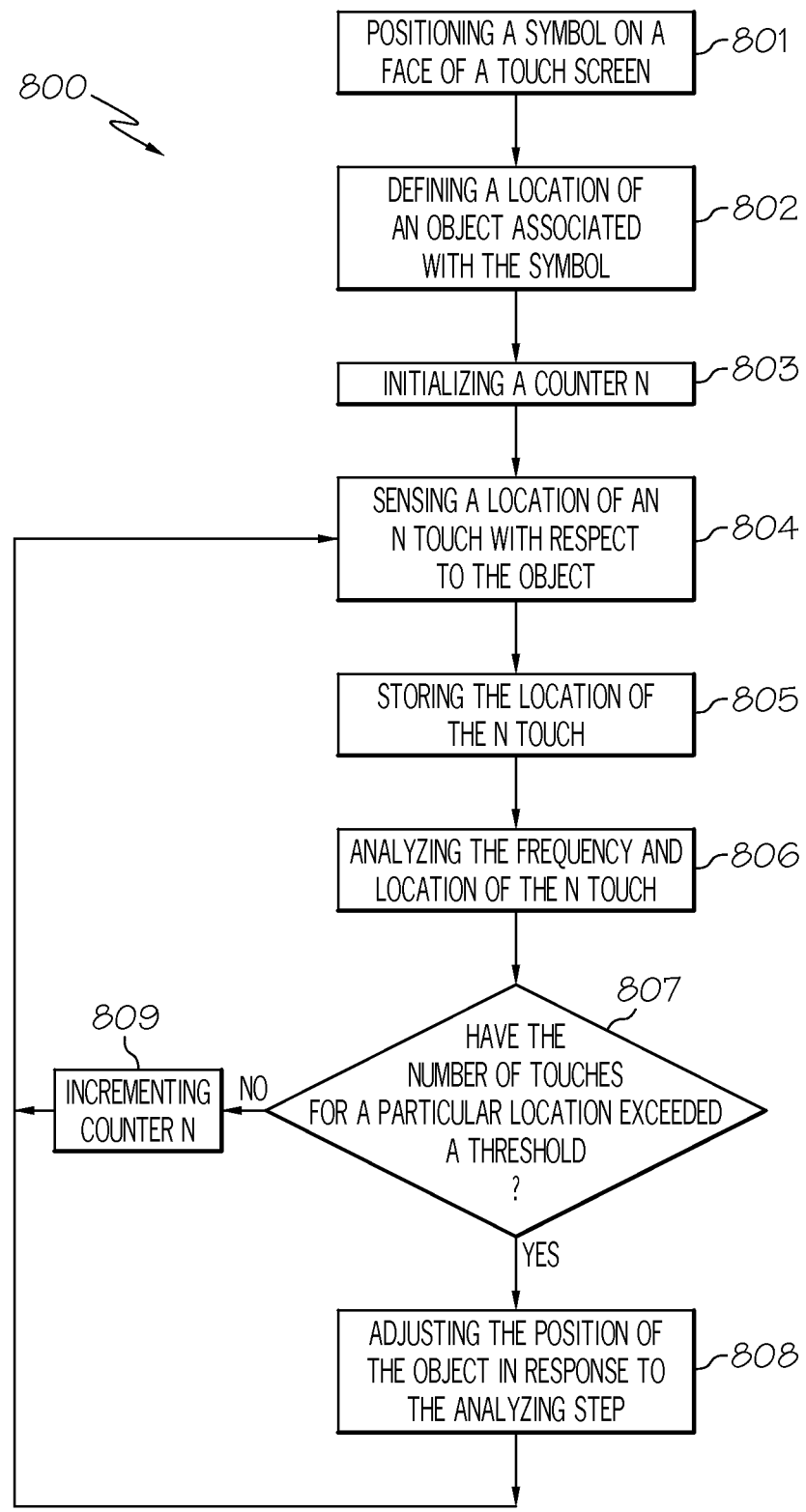
FIG. 8 is another flow chart in accordance with the exemplary embodiments.

FIGS. 4 and 8 are flow charts that illustrate touch screens processes suitable for use with a flight deck display system such as the user interface 102. Processes 400 and 700 represent implementations of a method for selecting symbols on an onboard display element of a host aircraft. The various tasks performed in connection with processes 400 and 700 may be performed by software, hardware, firmware, or any combination thereof. For illustrative purposes, the following description of processes 400 and 700 may refer to elements mentioned above in connection with FIGS. 5, 6 and 7. In practice, portions of processes 400 and 700 may be performed by different elements of the described system, e.g., a processor or a display element. It should be appreciated that processes 400 and 700 may include any number of additional or alternative tasks, the tasks shown in FIGS. 4 and 8 need not be performed in the illustrated order, and processes 400 and 700 may be incorporated into a more comprehensive procedure or process having additional functionality not described in detail herein. Moreover, one or more of the tasks shown in FIG. 8 could be omitted from an embodiment of the processes 700 as long as the intended overall functionality remains intact.

Referring to the flow chart of FIG. 4, and the touch screen 300 of FIG. 3, an object, for example the object 314 on the face 302 is defined for the symbol 304. By defining the object, step 401, it is meant that pixels defined by the conductive traces 212, 214 associated with the symbol 304 are selected by the processor 104. When a touch (represented by the dotted line 311) is sensed, step 402, by at least a portion of the pixels within the object 314, the location of the touch is stored by the processor 104 within the memory 103.

Figure 5:
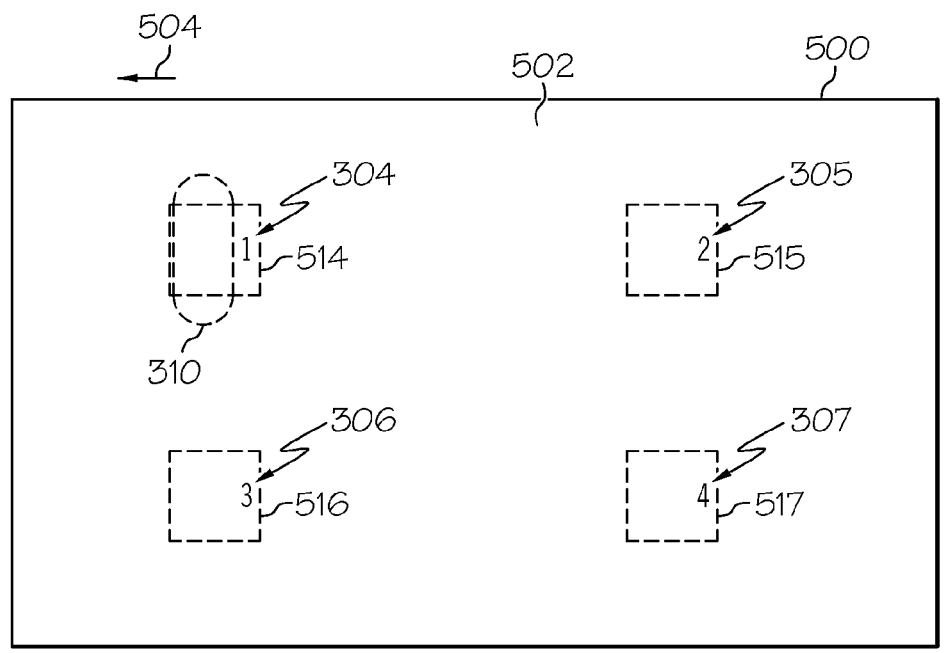
FIG. 5 is representative diagram of a touch screen in accordance with the exemplary embodiments.

Referring to FIG. 5, the touch screen 500 includes the face 502 and symbols 304, 305, 306, 307 as in FIG. 3. Preferably after several touches to a specific portion, for example the area 310, of the object 515 is moved to the left (represented by the arrow 504) with respect to the placement of the symbol 304. As a result, when the operator views the symbol 304 and touches the area 310 which is not directly over the symbol 304 due to parallax error or vibrations, the area 310 is more centered within the object 515.

While only one object 315 is being adjusted in the example above, several objects 315, 316, 317 could simultaneously be adjusted. By the object being adjusted, it is understood that the boundaries are being moved. For example, in the above example, the boundaries of the object 515 are both shifted in a first direction 504 with respect to the symbol 304 to place the object 515 in an improved alignment with the area 310. And while several touches evidencing a trend are preferred, the objects 314, 315, 316, 317 could be adjusted after only one touch.

Alternatively, only one boundary of an object may be adjusted. For example, referring to the touch screen 600 of FIG. 6, The left boundary 622 has been adjusted to the left, while the other boundaries remain unmoved as in FIG. 5.

Referring to FIG. 7, another touch screen 701 includes the face 702, and symbols 304, 305, 306, 307 as in FIG. 3. Preferably after several touches to a specific portion, for example the area 310, the boundaries of the object 714 is enlarged with respect to the previous object 314 (having an increased area), but remains centered with respect to the placement of the symbol 304. As a result, when the operator views the symbol 704 and touches the area 310 due to parallax error or vibrations, the likelihood of the area 310 being applied within the object 714 in increased.

In turbulence, it is likely that the user's accuracy will be reduced and touch locations may start being more scattered about the touch object rather than being clumped together as they would be under calm conditions. A wider distribution of touch locations can be used to determine that the object should be made larger so as to improve the user's chance of hitting the target. The change in size may apply to only the touch object or it may also be applied to the symbol associated with the object, giving the user a larger visual target at which to aim.

Referring to the flow chart of FIG. 8, another method of operating the exemplary embodiments include positioning 801 a symbol 304, 305, 306, 307 on a face 302, 502 of a touch screen 300, 500, defining 802 a location of an object 314, 315, 316, 317 associated with the symbol 304, 305, 306, 307, initializing a counter N=1 803, sensing 804 a location of an N touch with respect to the object 314, 315, 316, 317, storing 805 the location of the N touch, analyzing 806 the frequency and location of the N touch, adjusting the position of the object 314, 315, 316, 317 to create a new object 516, 517, 614, 615, 616, 617, 714, 715, 716, 717 in response to the analyzing step if the number of touches for a particular location exceed 807 a threshold, and if not, incrementing counter N 809 and returning to step 804.

Under normal conditions (no vibrations or parallax), the touch positions will have both high precision and high accuracy. The touch positions will be in a tight grouping and centered on the center of the visible symbol. If parallax becomes an issue, as in when the user is not directly in front of the screen, then a drop in accuracy is expected as the pattern of touches will show a shift from the center of the symbol towards the position of the user. Under turbulent conditions, with random motions and/or periodic vibrations to the touchscreen and/or the user, the precision of the touch will degrade and the pattern of touches will show an increase in the distance that sensed touch locations are distributed about the center of the symbol. If both parallax and turbulence are present, a loss of accuracy and precision would be envisioned, with a shift to the center of the pattern of touches and an increase in the distribution of touches about the calculated median position. A third type of analysis involves monitoring the timing of touches. Under turbulence, high vibration, or arm fatigue, the user may make multiple inadvertent touches in rapid succession when only one touch was desired or needed. The system may be configured to ignore extra touches within a certain time period so as to prevent accidental entries. The frequency of these multiple hits (even if the extra hits are not acted upon) may be recorded and if the number exceeds a threshold, the system's behavior can be modified to improve performance. For example, the user may be required to hold a touch for a longer period or to touch with greater force before an input is accepted. In another example, a screen may present a "slider" symbol and object. The user is required to touch the slider and maintain contact while dragging a digit along the surface of the screen. If intermittent contact is detected, the slider symbol and object may be replaced with a pair of arrow buttons.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A touch screen comprising:
   a display face including an object, the display face configured to display a symbol within the object; and
   circuitry defining the object and configured to:
      sense a position and frequency of N touches on at least a portion of the object;
      storing the position and frequency of the N touches; and
      analyzing the position and frequency of the N touches; and
   a touch screen controller configured to:
      adjust the position of the object in response to the analyzing step if the position or frequency of touches has exceeded a threshold.

2. The touch screen of claim 1 wherein the display face comprises a non-transparent layer configured to receive the N touches.

3. The touch screen of claim 1 wherein the touch screen controller is further configured to enable a function in response to the N touches.

4. The touch screen of claim 1 wherein the object comprises a boundary and the touch screen controller is configured to adjust the boundary.

5. The touch screen of claim 1 wherein the object comprises a boundary and the touch screen controller is configured to enlarge the boundary.

6. The touch screen of claim 1 wherein the display face includes a plurality of objects and is configured to display one of a plurality of symbols within each object, wherein the touch screen controller is configured to adjust the plurality of objects in response to the position and frequency of the N touches.

7. The touch screen of claim 1 wherein the symbol comprises at least one of an alphanumeric character, an icon, a word, or a phrase.

8. The touch screen of claim 1 wherein the circuitry is configured to sense a resistance in response to the N touches.

9. The touch screen of claim 1 wherein the circuitry is configured to sense a capacitance in response to the N touches.

10. The touch screen of claim 1 wherein the circuitry is configured to sense an Infrared frequency in response to the N touches.

11. A touch screen comprising:
    a display face including an object having boundaries, the display face configured to display an icon within the boundaries; and
    circuitry in communication with the display face and configured to:
       define the boundaries;
       sense a frequency and location of N touches by an operator on at least a portion of the object, wherein N is at least 1;
       store the frequency and the location of the N touches;
       analyze the frequency and the location of the N touches; and
    a touch screen controller configured to:
       adjust at least one of the boundaries of the object in response to the analyzing step.

12. The touch screen of claim 11 wherein the display face comprises a non-transparent layer configured to receive the N touches.

13. The touch screen of claim 11 wherein the touch screen controller is further configured to enable a function in response to the N touches.

14. The touch screen of claim 11 wherein the object comprises a boundary and the touch screen controller is configured to adjust the boundary.

15. The touch screen of claim 11 wherein the object comprises a boundary and the touch screen controller is configured to enlarge the boundaries.

16. The touch screen of claim 11 wherein the display face includes a plurality of objects and is configured to display one of a plurality of symbols within each object, wherein the touch screen controller is configured to adjust the plurality of objects in response to the position of the N touches.

17. A method for adjusting an object of a touch screen, the object configured to sense a touch, comprising:
    defining a location of the object on a face of the touch screen for selecting an associated symbol when touched;
    sensing the frequency and location of N touches on the object;
    storing the frequency and location of the N touches;
    analyzing the frequency and the location of the N touches; and
    adjusting the object in response to the analyzing step if the location or frequency of the N touches have exceeded a threshold.

* * * * *